(12) United States Patent
Klembczyk

(10) Patent No.: US 6,345,707 B1
(45) Date of Patent: Feb. 12, 2002

(54) FRICTIONLESS DAMPER

(75) Inventor: Alan R. Klembczyk, Cheektowaga, NY (US)

(73) Assignee: Tayco Developments, Inc., North Tonawanda, NY (US)

( * ) Notice: Subject to any disclaimer, the term of this patent is extended or adjusted under 35 U.S.C. 154(b) by 0 days.

(21) Appl. No.: 09/556,094

(22) Filed: Apr. 21, 2000

(51) Int. Cl.⁷ .................. F16F 9/04; F16F 9/08
(52) U.S. Cl. .............. 188/298; 188/322.16; 188/315; 188/373
(58) Field of Search ................ 188/297, 298, 188/314, 315, 317, 322, 322.14, 280.1, 282.5, 282.6, 283, 313, 322.16

(56) References Cited

U.S. PATENT DOCUMENTS

| | | | | |
|---|---|---|---|---|
| 3,604,725 A | * | 9/1971 | Goff | 267/64.19 |
| 4,076,225 A | * | 2/1978 | Houghton | 188/285 |
| 4,306,638 A | * | 12/1981 | Malott | 188/315 |
| 4,768,627 A | * | 9/1988 | Taylor | 188/280 |
| 4,815,574 A | | 3/1989 | Taylor et al. | 188/280 |
| 5,120,200 A | * | 6/1992 | Cater, III | 188/290 |
| 5,133,435 A | * | 7/1992 | Taylor | 188/281 |
| 5,159,997 A | * | 11/1992 | Heideman et al. | 188/322.156 |
| 5,487,454 A | * | 1/1996 | Klembczyk et al. | 188/298 |
| 5,727,663 A | | 3/1998 | Taylor | 188/378 |
| 6,035,740 A | * | 3/2000 | Budaker et al. | 267/120 |

* cited by examiner

Primary Examiner—Robert J. Oberleitner
Assistant Examiner—Devon Kramer
(74) Attorney, Agent, or Firm—Joseph P. Gastel

(57) ABSTRACT

A hydraulic damper including an inner cylinder, an outer cylinder, a space between the inner and outer cylinders, first and second end walls in the inner cylinder, a piston rod extending only through the first end wall and supported therein by a ball bearing assembly, a first portion of the piston on one side of the first end wall and within the inner cylinder, a second portion of the piston on the opposite side of the first end wall and external to the inner cylinder, a piston head on the first portion of the piston rod within the inner cylinder, a first chamber in the inner cylinder between the piston head and the first end wall, a second chamber in the inner cylinder between the piston head and the second end wall, an accumulator in communication with the second chamber, a fluid-containing seal between the first end wall and the second portion of the piston rod, and a closed fluid circuit between the accumulator and the fluid-containing seal through the space between the inner and outer cylinders.

40 Claims, 8 Drawing Sheets

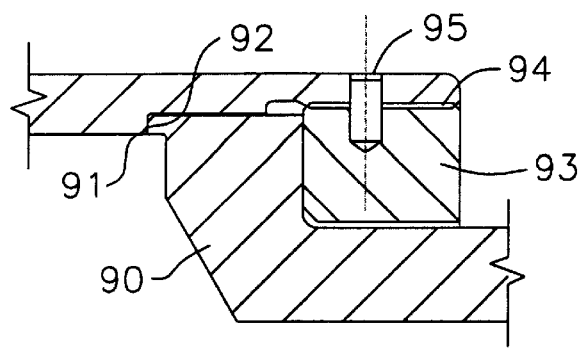
FIG. 6A
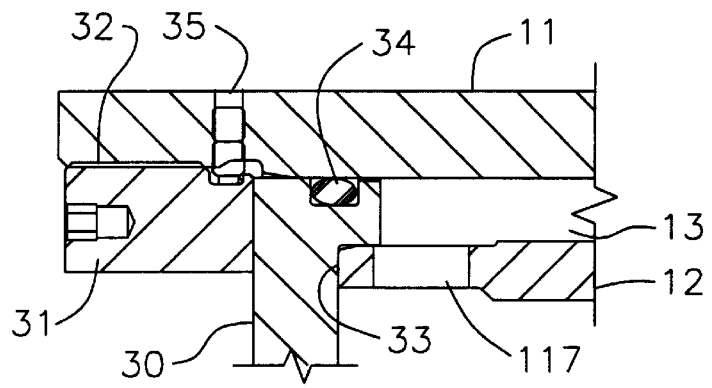
FIG. 7A
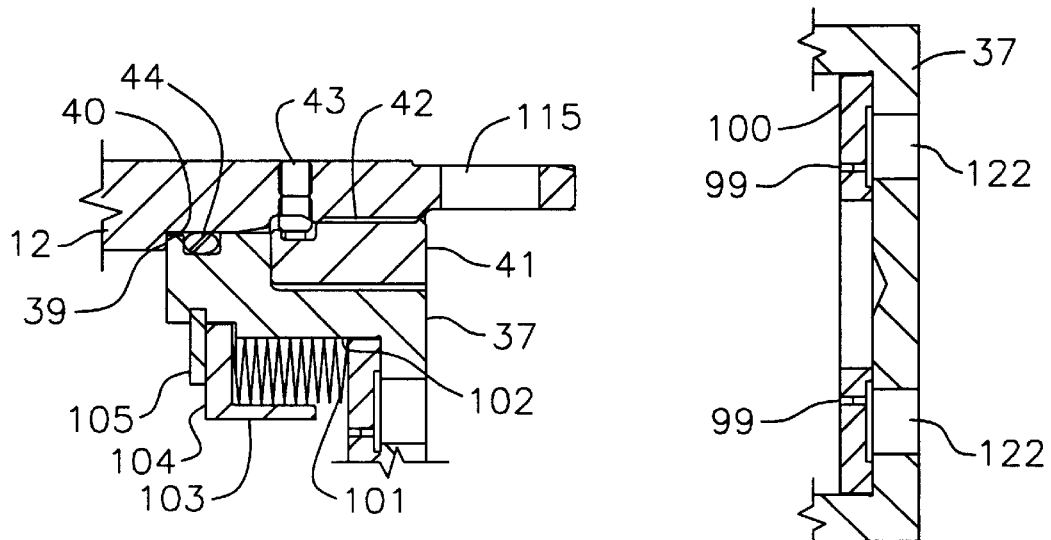
FIG. 9A
FIG. 9B

US 6,345,707 B1

FRICTIONLESS DAMPER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a frictionless hydraulic damper wherein the piston rod extends only through one end wall and the damper has a closed sealed hydraulic circuit.

By way of background, the prior art discloses numerous frictionless hydraulic dampers in U.S. Pat. Nos. 4,638,895, 4,768,627 and 4,815,574. In all of these patents the hydraulic fluid is confined within a closed circuit which includes bellows seals between the piston rod and other parts of the damper. In these patents all of the fluid which is used for damping is confined within a single cylinder and various bellows seals. The closed circuit could be achieved because the piston rod was double-ended and extended through the end walls of the cylinder. However, the foregoing type of sealed frictionless arrangement could not be achieved with a damper wherein the piston rod extended only through one end wall of the cylinder.

BRIEF SUMMARY OF THE INVENTION

It is one object of the present invention to provide a frictionless hydraulic damper wherein the piston rod extends only through one end wall of the cylinder and in which the hydraulic fluid is completely confined within a closed sealed circuit.

It is another object of the present invention to provide a frictionless damper as described in the preceding object and in which hydraulic fluid can circulate in a closed sealed circuit which includes an annular space between inner and outer cylinders.

Another object of the present invention is to provide a frictionless hydraulic damper wherein an inner damping cylinder is concentrically positioned within an outer cylinder with an annular space therebetween which conducts damping fluid externally of opposite end walls of the damping cylinder so that heat which is generated as a result of the damping action is dissipated from the relatively large surface area of the outer cylinder.

A still further object of the present invention is to provide an improved frictionless damper wherein the piston rod is supported by a ball bearing assembly. Other objects and attendant advantages of the present invention will readily be perceived hereafter.

The present invention relates to a hydraulic damper comprising a cylinder, first and second end walls in said cylinder, a piston rod extending only through said first end wall, a first portion of said piston on one side of said first end wall and within said cylinder, a second portion of said piston on the opposite side of said first end wall and external to said cylinder, a piston head on said first portion of said piston rod within said cylinder, a first chamber in said cylinder between said piston head and said first end wall, a second chamber in said cylinder between said piston head and said second end wall, an accumulator in communication with said second chamber, a fluid-containing seal between said first end wall and said second portion of said piston rod, and a closed fluid circuit between said accumulator and said fluid-containing seal.

The present invention also relates to a hydraulic damper comprising a cylinder having an end wall, a piston rod extending through the end wall, and a ball bearing assembly mounted in said end wall for supporting said piston rod.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 6A is an enlarged fragmentary view of the upper portion of FIG. 6 showing the mounting for the clevis assembly;

FIG. 7A is an enlarged fragmentary view of the portion of FIG. 7 showing the mounting between the inner and outer cylinders;

FIG. 9A is an enlarged fragmentary view of the portion of FIG. 9 showing the mounting of the end wall of the inner cylinder;

FIG. 9B is an enlarged fragmentary view showing the flapper valve of FIG. 9;

DETAILED DESCRIPTION OF THE INVENTION

Summarizing briefly in advance, the frictionless damper 10 performs the function of providing substantially frictionless damping without leakage of hydraulic fluid because of its unique construction wherein the piston rod is supported by ball bearings in an inner damping cylinder and leakage of hydraulic fluid is prevented by an unique damping fluid circuit consisting of an expandable bellows seal surrounding the external portion of the piston rod at one end of the inner damping cylinder and a hydraulic fluid accumulator at the opposite end of the inner fluid path is provided between the expandable bellows seal and the accumulator through a space between the inner damping cylinder and an outer cylinder surrounding the inner damping cylinder.

Figure 5A:
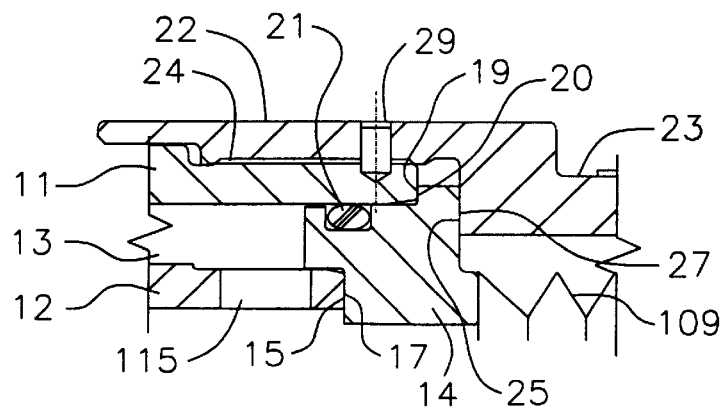
FIG. 5A is an enlarged fragmentary view of the upper central portion of FIG. 5 showing the mounting of the accumulator housing on the end of the outer cylinder.

The frictionless damper 10 includes an outer cylinder 11 having an inner damping cylinder 12 mounted therein with an annular space 13 therebetween. The right ends of cylinders 11 and 12 are secured to each other in spaced relationship by ring 14 (FIGS. 5 and 5A) having a shoulder 15 which bears on the annular end 17 of inner cylinder 12. Ring 14 also includes an annular shoulder 19 which bears on annular end 20 of outer cylinder 11. An O-ring 21 is located between ring 14 and outer cylinder 11. The foregoing assembled relationship is maintained by the end 22 of accumulator housing 23 being threaded onto outer cylinder 11 at threaded joint 24 and with shoulder 25 of accumulator housing 23 bearing against the end 27 of ring 14. A set screw 29 locks the accumulator housing 23 to outer cylinder 11.

Figure 3:
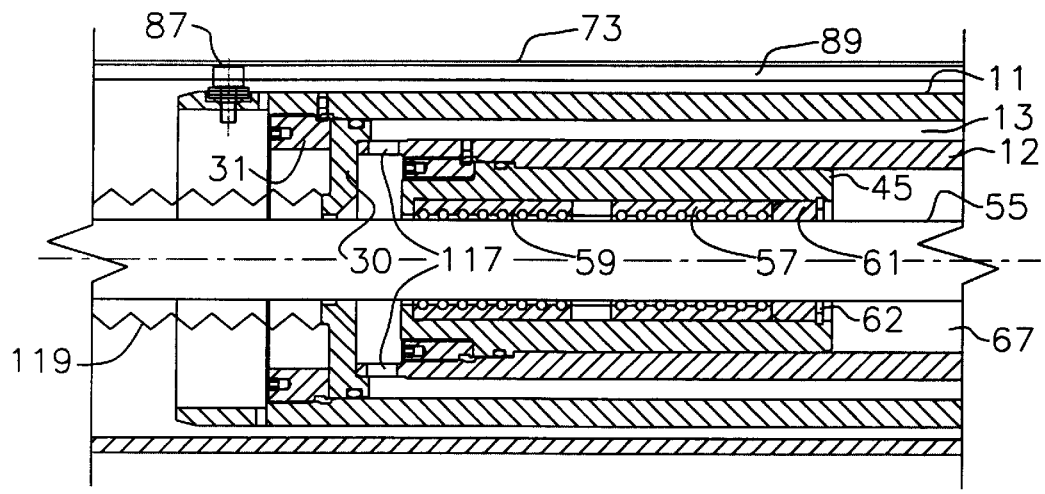
FIG. 3 is an enlarged fragmentary view of a central portion of the damper of FIG. 1 and showing the connection between the inner and outer cylinders and also showing the end wall of the inner cylinder having the ball bearing mountings for the piston rod.
Figure 7:
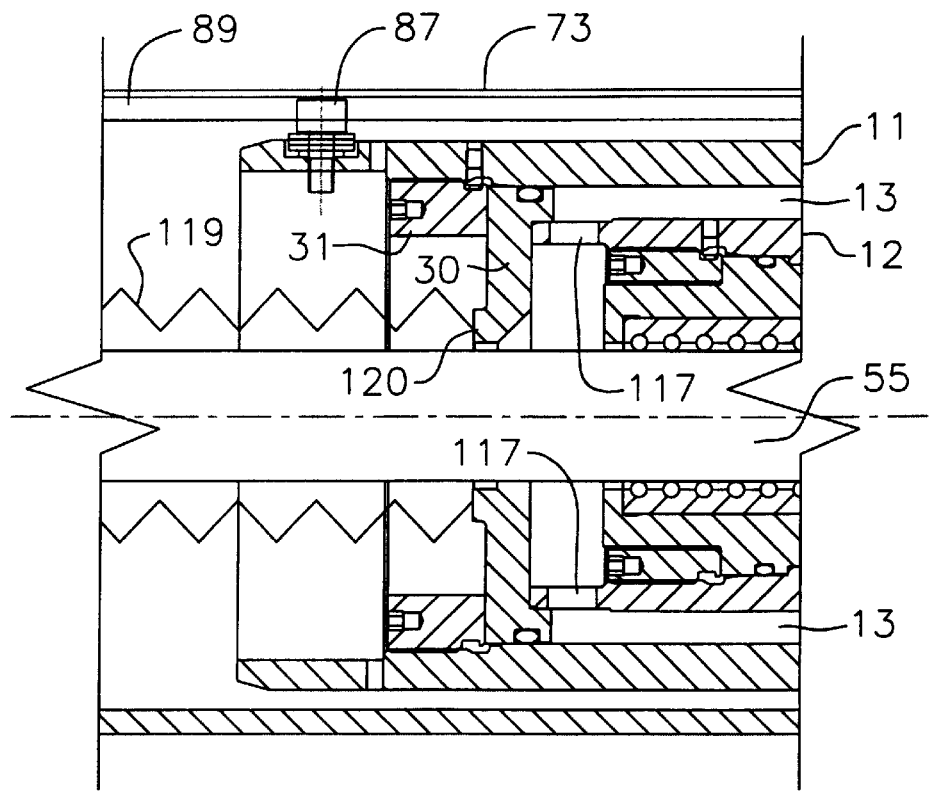
FIG. 7 is a further enlarged fragmentary portion of FIG. 3 showing the details of the connection between the inner and outer cylinders and the mounting of the ball bearings.

The left ends of cylinders 11 and 12 (FIGS. 3, 7 and 7A) are joined by ring 30 and annular nut 31 which is threaded into outer cylinder 11 at 32 and which bears against ring 30 to cause it to bear against end 33 of inner cylinder 12. An O-ring 34 is positioned between ring 30 and outer cylinder 11. A set screw 35 locks nut 31 in position. It will be appreciated that nut 31 is threaded into outer cylinder 11 until ring 30 presses firmly against the end 33 of inner cylinder 12. The movement to the right of inner cylinder 12 during this threading operation is limited by the fact that its end 17 (FIG. 5A) bears against ring 14 which is held in position against movement to the right because of its relationship with shoulder 25 of accumulator housing 23.

An end wall 37 (FIGS. 5, 9 and 9A) is mounted at the right end of inner cylinder 12. In this respect, the annular end portion 39 (FIG. 9A) of end wall 37 bears against shoulder 40 of inner cylinder 12. A nut 41 is threaded into inner cylinder 12 at 42 and is retained in position by set screw 43. An O-ring 44 is positioned between the outer periphery of end wall 37 and the adjacent surface of inner cylinder 12.

Figure 3A:
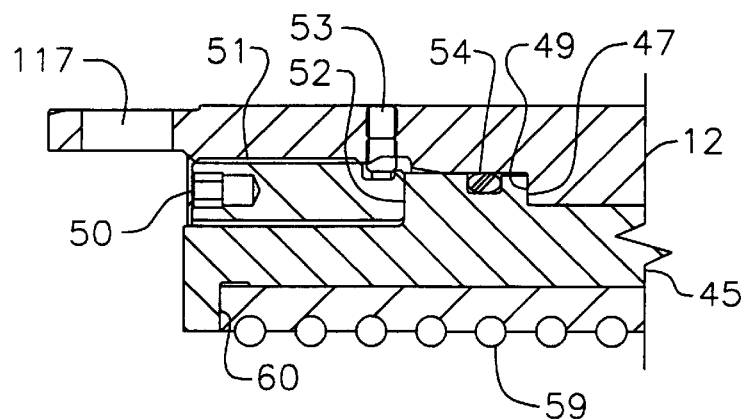
FIG. 3A is an enlarged fragmentary view of a portion of FIG. 3 showing the left end of the left end wall of the inner cylinder.

An elongated end wall 45 (FIGS. 1, 3 and 3A) is mounted in the left end of inner cylinder 12. In this respect, end wall 45 has an annular shoulder 47 (FIG. 3A) which bears against annular shoulder 49 of inner cylinder 12. A nut 50 is threaded into inner cylinder 12 at 51, and it bears against shoulder 52 of end wall 45. A set screw 53 retains nut 50 in position. An O-ring 54 is positioned between end wall 45 and inner cylinder 12. A piston rod 55 (FIG. 3) is supported in ball bearing assemblies 57 and 59 mounted in end wall 45. Bearing 59 abuts shoulder 60 (FIG. 3A) of end wall 45, and a labyrinth seal or bushing 61 (FIG. 3) abuts bearing 57 and it is retained within end wall 45 by snap ring 62.

A piston head 63 is mounted on the end of piston rod 55, and it has bores 64 therein into which orifice plugs (not shown) are positioned and through which hydraulic fluid passes between chambers 65 and 67 as the piston moves within inner cylinder 12. There is a clearance between labyrinth seal 61 and piston rod 55 so that there is a slight leakage of hydraulic fluid past seal 61 and past ball bearings 57 and 59. The preferred hydraulic fluid which is used in damper 11 is DEXRON III hydraulic transmission fluid which gives good lubrication to the ball bearings and provides the required damping. However, any other suitable hydraulic fluid can be used.

Figure 8:
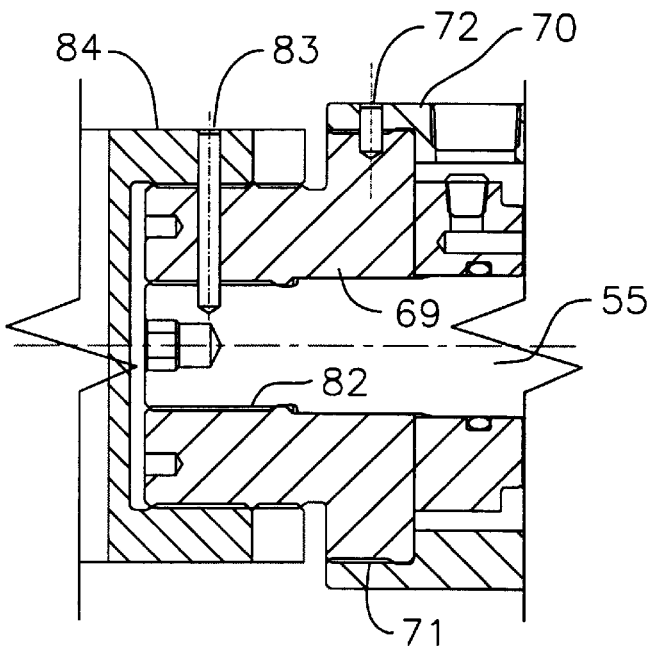
FIG. 8 is an enlarged fragmentary view of the connection between the end of the piston rod and the clevis nut and the clevis.

The left end of piston 55 (FIGS. 1 and 2) is mounted within rod clevis nut 69 (FIGS. 1 and 2) which is threaded into the annular end of sleeve extender 70 at 71 and retained therein by set screw 72. A sleeve 73 (FIGS. 1, 2 and 2A) is mounted on sleeve extender 70. In this respect, the annular shoulder portion 74 of sleeve extender 70 engages annular shoulder 75 of sleeve 73. A nut 77 is threaded into sleeve 73 at 79 such that shoulders 74 and 75 are in tight engagement as is shoulder 80 of sleeve extender 70 with nut 77. A set screw 81 retains the foregoing assembly in assembled relationship. The rod clevis nut 69 (FIGS. 2 and 8) is threaded onto piston rod 55 at 82, and an anti-rotation pin 83 is inserted between clevis 84 and clevis nut 69.

Figure 4:
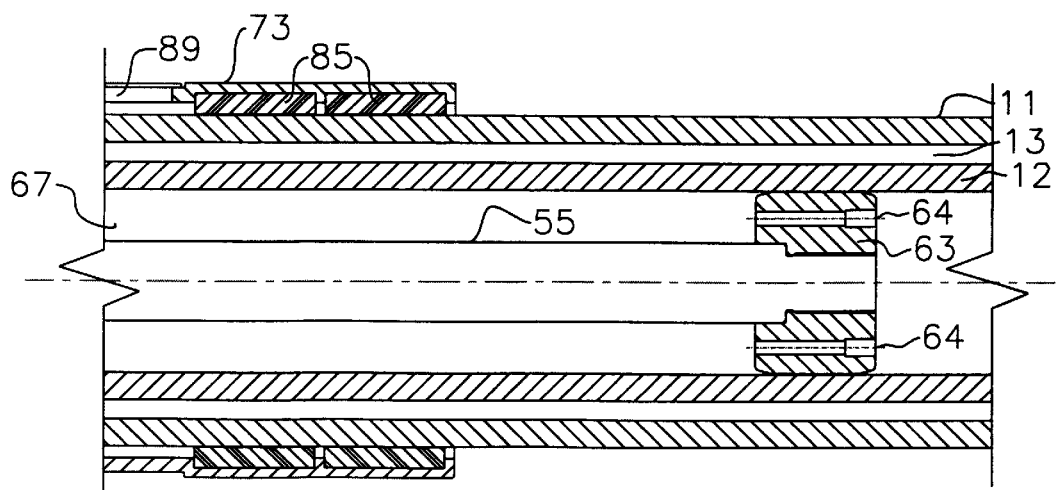
FIG. 4 is an enlarged fragmentary view of the central portion of the damper of FIG. 1 showing the piston head mounted on the piston rod and the connection between the outer sleeve and the outer cylinder.

The right end of sleeve 73 (FIG. 4) rides on outer cylinder 11 and it has annular TEFLON sleeve guides 85 which encircle outer cylinder 11 and have a clearance therewith so that the outer end of sleeve 73 will pass along the outer surface of outer cylinder 11 without appreciable friction as piston rod 55 moves into and out of inner cylinder 12. Sleeve 73 is guided for perfectly rectilinear motion by a cam follower 87 (FIGS. 1, 3 and 7) which rides in slot 89 of sleeve 73.

Figure 6:
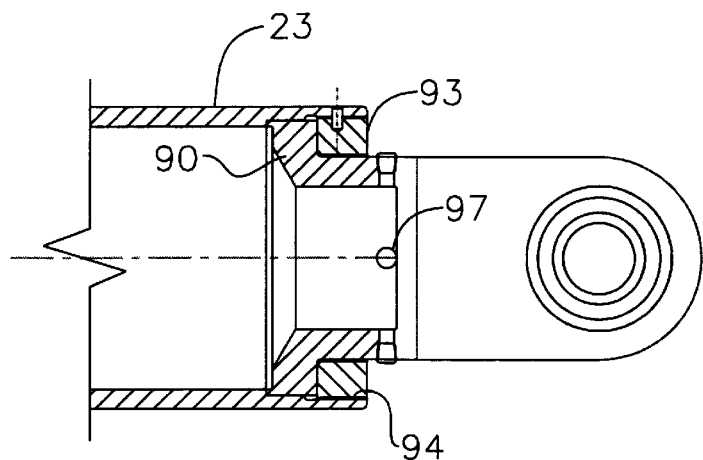
FIG. 6 is an enlarged fragmentary view of the right end of the damper with the clevis assembly mounted on the accumulator housing.

A clevis 90 (FIGS. 1, 6 and 6A) is mounted in the right end of accumulator housing 23. In this respect, the outer annular end 91 of clevis 90 bears against shoulder 92 (FIG. 6A) of accumulator housing 23 as it is forced into this position by nut 93 which is threaded into accumulator housing 23 at 94 and the nut 93 is retained in position by set screw 95. A vent hole 97 (FIG. 6) is provided in clevis 90 to vent the chamber within accumulator housing 23.

Figure 5:
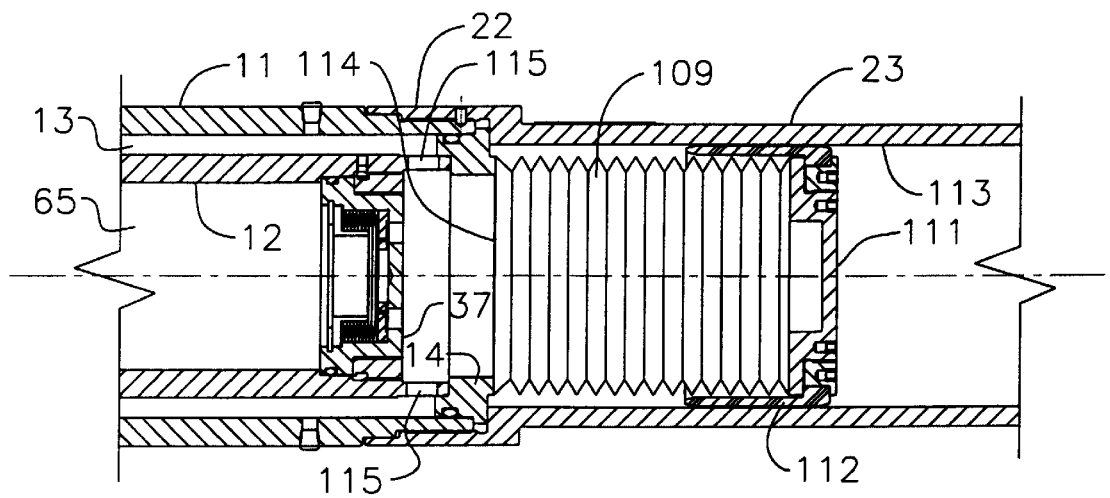
FIG. 5 is an enlarged fragmentary view of the portion of FIG. 1 showing the connection between the inner and outer cylinders and also showing the accumulator bellows and its mounting relative to the accumulator housing.
Figure 9:
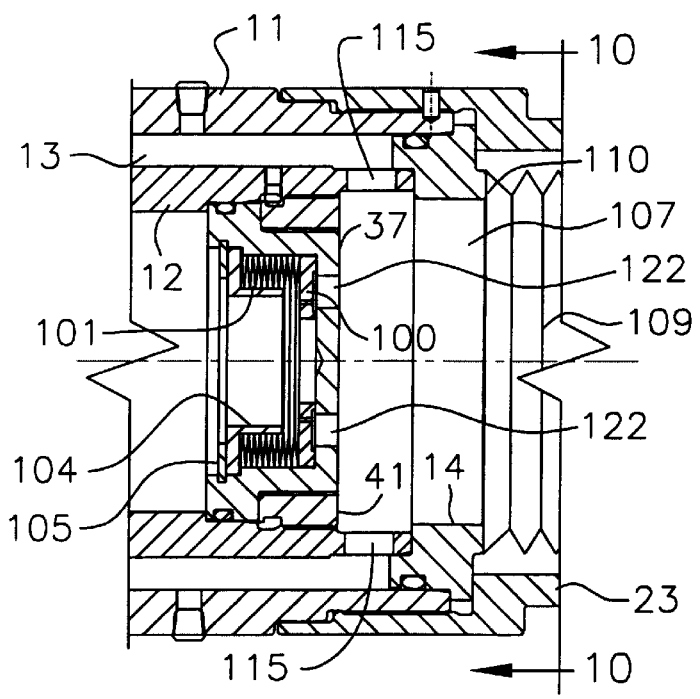
FIG. 9 is a further enlarged fragmentary view of the right end wall of the inner cylinder mounting the one-way valve and showing the connection between the inner and outer cylinders and the connection of the accumulator bellows to the connection between the inner and outer cylinders.
Figure 10:
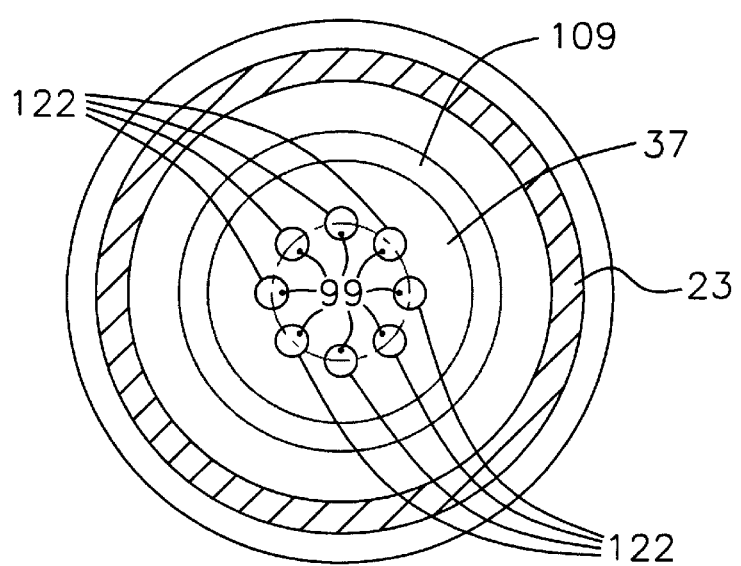
FIG. 10 is a cross sectional view taken substantially along line 10—10 of FIG. 9.
Figure 11:
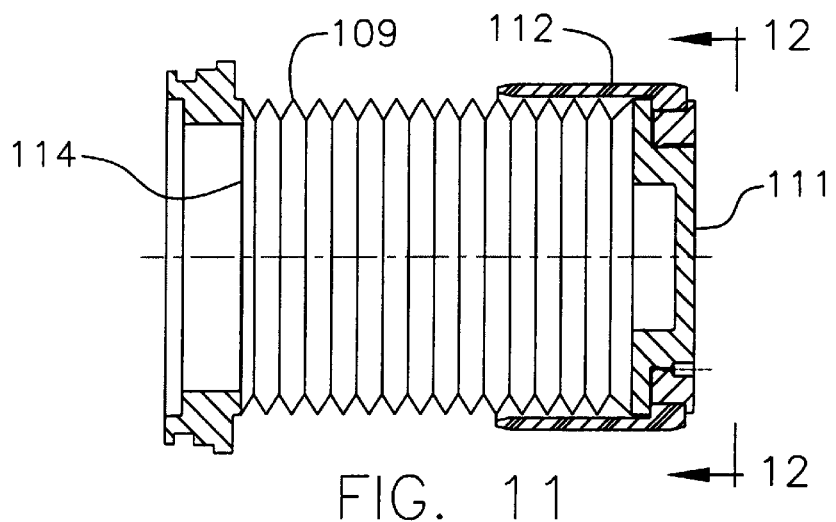
FIG. 11 is an enlarged view of the accumulator bellows and its end which slides within the accumulator housing.

As noted above, as piston rod 55 and piston head 63 move back and forth, there will be a transfer of hydraulic fluid between chambers 65 and 67 on opposite sides of piston head 63. When piston head 63 is moving to the right in FIGS. 1 and 4, there will be a passage of a certain amount of hydraulic fluid through the orifice plugs (not shown) in piston head openings 64. There will also be a slight amount of fluid passing through end wall 37 through very small metering orifices 99 (FIGS. 9B and 10) in flapper valve 100 which is biased to a closed position by spring 101 (FIGS. 9 and 9A) which is retained in position between the inner surface 102 of end wall 37 and annular horizontally extending portion 103 of annular member 104 which is retained in position within end wall 37 by snap ring 105. The amount of hydraulic fluid passing through orifices 99 also passes through orifices 122 (FIG. 9B) in end wall 37 and enters the space 107 (FIG. 9) to the right of end wall 37, and such fluid may continue on into metal accumulator bellows 109 which has its end 110 sealed to ring 14 (FIGS. 5 and 9). The amount of fluid passing through valve orifices 99 is equal to the displacement of piston rod 55 entering chamber 67. The metal accumulator bellows 109 provides longevity inasmuch as it is not subject to the more rapid deterioration of a non-metal bellows.

Figure 12:
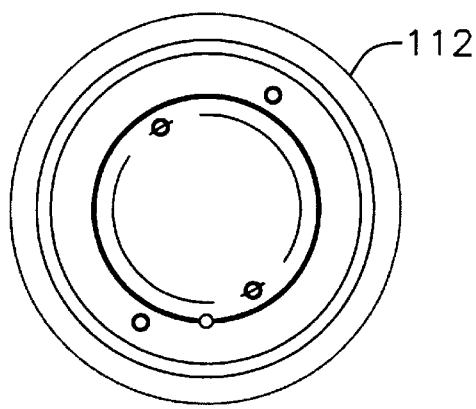
FIG. 12 is an end elevational view taken substantially in the direction of arrows 12—12 of FIG. 11.
Figure 13:
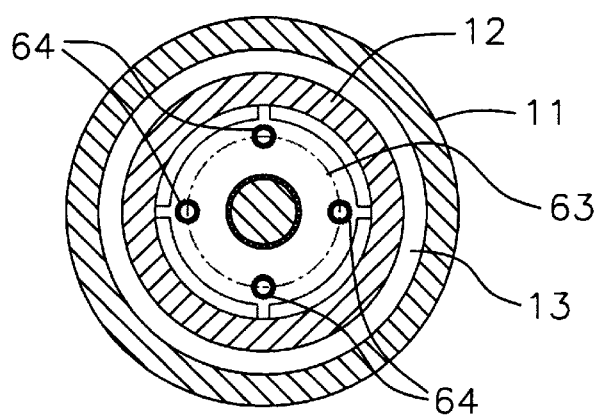
FIG. 13 is a cross sectional view taken substantially along line 13—13 of FIG. 1.

The opposite end of metal bellows 109 is closed and mounted on a bellows slider assembly 111 (FIGS. 1, 5 and 12) which includes an annular TEFLON member 112 which has a clearance with the inner surface 113 of accumulator housing 23. Thus, the right end of bellows 109 essentially floats as it moves rectilinearly within accumulator housing 23 without creating any substantial friction therewith as hydraulic fluid enters and leaves the open left end 114 of metal accumulator bellows 109. Additionally, fluid which passes through closed flapper valve 100 may pass through a plurality of bores 115 (FIGS. 5 and 9) which are equally spaced at 45° intervals in the right end of inner cylinder 20. The hydraulic fluid can then pass through the annular space 13 between inner damping cylinder 12 and outer cylinder 11 and thereafter pass through a plurality of circumferentially spaced bores 117 (FIG. 7) in inner cylinder 12 and through the space between ring 30 and piston rod 55 into elongated bellows expandable volume seal 119 which has its right open end sealed onto the end 120 of ring 30 (FIG. 7) and its left end sealed onto the end 121 of rod clevis nut 69.

Figure 1:
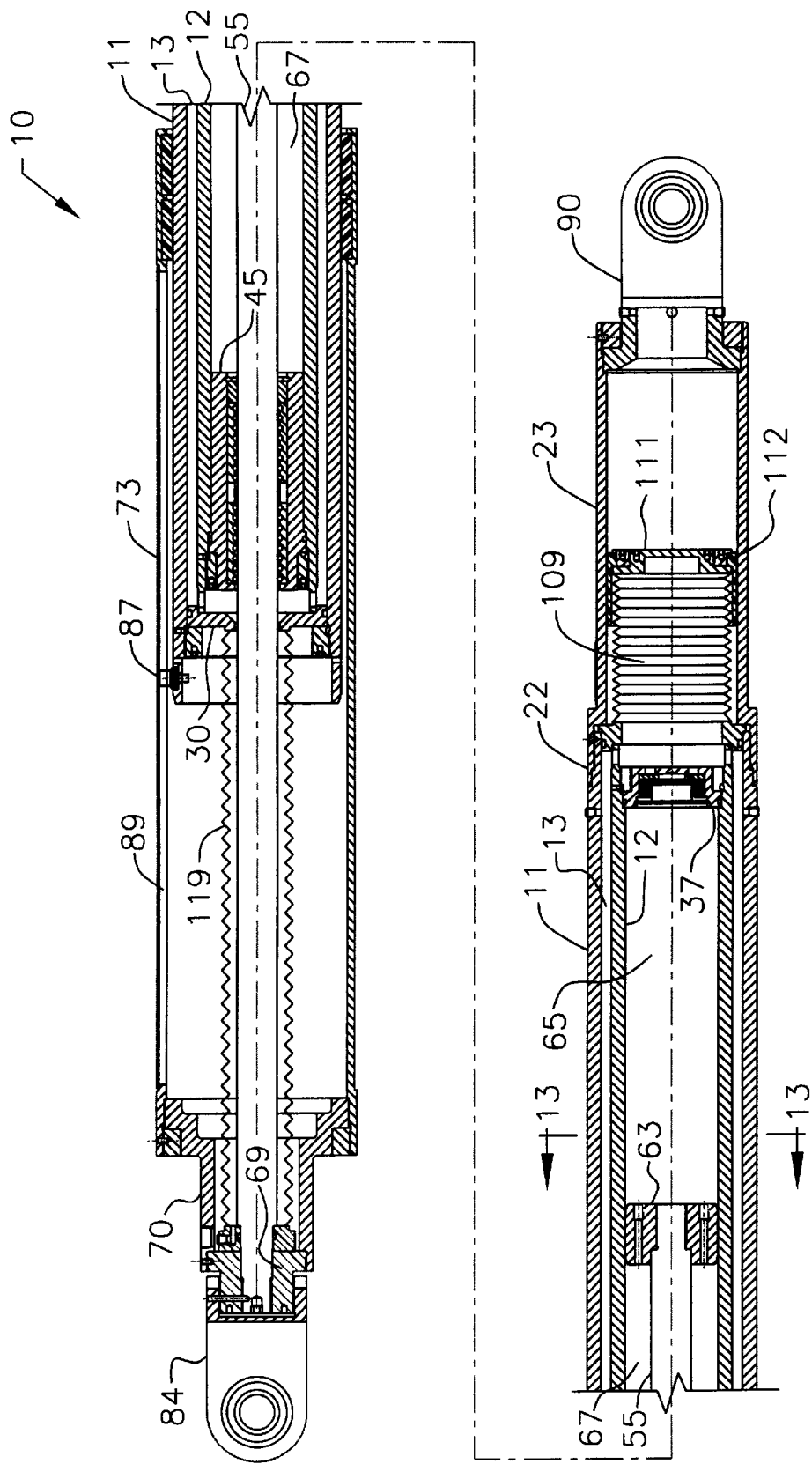
FIG. 1 is a split cross sectional view of the frictionless damper of the present invention.
Figure 2:
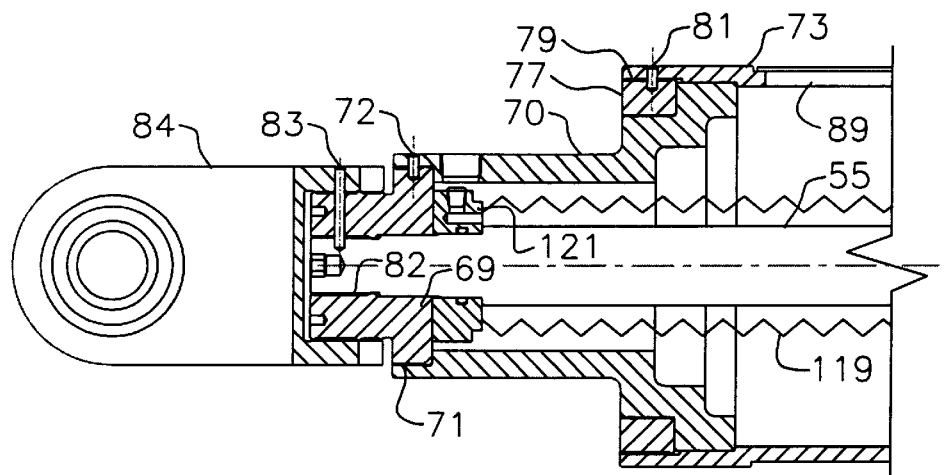
FIG. 2 is an enlarged fragmentary view of the left end of the damper of FIG. 1.
Figure 2A:
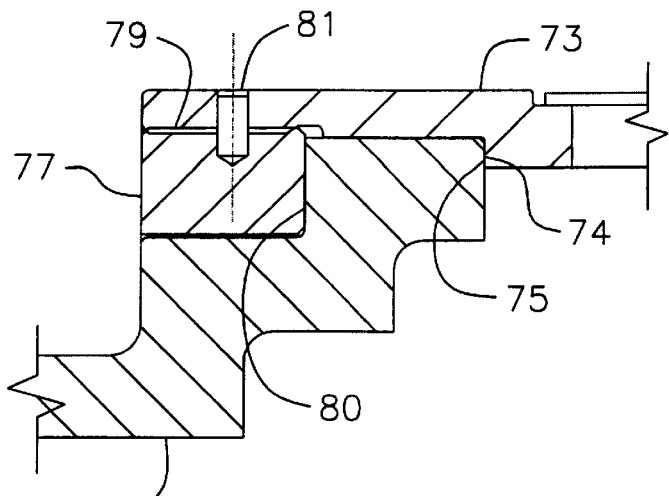
FIG. 2A is an enlarged fragmentary view of the upper portion of FIG. 2.

When piston head 63 and piston rod 65 move to the left in FIG. 1, there will be a certain amount of flow of hydraulic fluid through piston head 63. There will also be a fluid flow from accumulator bellows 109 through space 107 (FIG. 9) and through bores 122 in end wall 37 because at this time flapper valve 100 (FIG. 9) will be unseated against the bias of spring 101. Also, there may be flow from accumulator bellows 109 through inner cylinder bores 115, the annular space 113 between inner cylinder 12 and outer cylinder 11, and bores 117 in the left end of inner cylinder 12 and into expandable volume metal bellows seal 119. Additionally, as piston head 63 moves to the left, there will be flow from chamber 67 through labyrinth seal 61 and bearings 57 and 59 toward bellows seal 119.

It can thus be seen that the substantially frictionless support of piston shaft 55 by labyrinth seal 61 and roller bearings 57 and 59 may be effected notwithstanding any leakage past them because the hydraulic fluid in the system is always contained within the chambers 65 and 67 and the accumulator bellows 109 and the bellows seal 119 and the annular space 13 between inner cylinder 12 and outer cylinder 11.

There is considerable heat generated in the hydraulic fluid as piston head 63 moves within inner cylinder 12. As noted above, there is a flow of hydraulic fluid through annular space 13 between cylinders 11 and 12. The heat in the hydraulic fluid is dissipated through the extensive surface area of outer cylinder 11.

While not shown in the drawing, a series of fluid orifices may be placed axially in inner cylinder 12 between piston head 63 and end wall 37 and between piston head 63 and end wall 45 to produce stroke-dependent damping in both directions. As the piston head 63 passes across these orifices, the fluid will thus pass through these orifices into the annular space 13, and increased damping will occur, and the damping can thus even approach a snubbing action. While the above type of stroke-dependent damping is known in the prior art, it is believed to be novel in the present combination.

While a preferred embodiment of the present invention has been disclosed, it will be appreciated that it is not limited thereto but may be otherwise embodied within the scope of the following claims.

What is claimed is:

1. A hydraulic damper comprising a cylinder, first and second end walls in said cylinder, a piston rod extending only through said first end wall, a first portion of said piston rod on one side of said first end wall and within said cylinder, a second portion of said piston rod on the opposite side of said first end wall and external to said cylinder, a piston head on said first portion of said piston rod within said cylinder, a first chamber in said cylinder between said piston head and said first end wall, a second chamber in said cylinder between said piston head and said second end wall, an accumulator in communication with said second chamber, a fluid-containing seal between said first end wall and said second portion of said piston rod, and a closed fluid circuit between said accumulator and said fluid-containing seal.

2. A hydraulic damper as set forth in claim 1 wherein said accumulator is a metal bellows accumulator.

3. A hydraulic damper as set forth in claim 2 including an accumulator housing outside of said metal bellows accumulator, and a frictionless mounting between said metal bellows accumulator and said accumulator housing.

4. A hydraulic damper as set forth in claim 2 wherein said fluid-containing seal is a metal bellows seal.

5. A hydraulic damper as set forth in claim 4 including an accumulator housing outside of said metal bellows accumulator, and a frictionless mounting between said metal bellows accumulator and said accumulator housing.

6. A hydraulic damper as set forth in claim 1 wherein said fluid-containing seal is a metal bellows seal.

7. A hydraulic damper as set forth in claim 1 including at least one metering orifice in said second end wall effecting communication between said cylinder and said accumulator.

8. A hydraulic damper as set forth in claim 7 wherein said accumulator is a metal bellows accumulator.

9. A hydraulic damper as set forth in claim 8 including an accumulator housing outside of said metal bellows accumulator, and a frictionless mounting between said metal bellows accumulator and said accumulator housing.

10. A hydraulic damper as set forth in claim 8 wherein said fluid-containing seal is a metal bellows seal.

11. A hydraulic damper as set forth in claim 10 including an accumulator housing outside of said metal bellows accumulator, and a frictionless mounting between said metal bellows accumulator and said accumulator housing.

12. A hydraulic damper as set forth in claim 7 wherein said fluid-containing seal is a metal bellows seal.

13. A hydraulic damper as set forth in claim 7 including a valve in said second end wall effecting one-way fluid flow from said accumulator to said second chamber.

14. A hydraulic damper as set forth in claim 13 wherein said accumulator is a metal bellows accumulator.

15. A hydraulic damper as set forth in claim 14 including an accumulator housing outside of said metal bellows accumulator, and a frictionless mounting between said metal bellows accumulator and said accumulator housing.

16. A hydraulic damper as set forth in claim 14 wherein said fluid-containing seal is a metal bellows seal.

17. A hydraulic damper as set forth in claim 13 wherein said fluid-containing seal is a metal bellows seal.

18. A hydraulic damper as set forth in claim 13 wherein said at least one metering orifice is in said valve.

19. A hydraulic damper as set forth in claim 1 including ball bearings in said first end wall mounting said piston rod.

20. A hydraulic damper as set forth in claim 19 including at least one metering orifice in said second end wall effecting communication between said cylinder and said accumulator.

21. A hydraulic damper as set forth in claim 20 including a valve in said second end wall effecting one-way fluid flow from said accumulator to said cylinder.

22. A hydraulic damper as set forth in claim 21 wherein said at least one metering orifice is in said valve.

23. A hydraulic damper as set forth in claim 19 wherein said accumulator is a metal bellows accumulator.

24. A hydraulic damper as set forth in claim 23 including an accumulator housing outside of said metal bellows accumulator, and a frictionless mounting between said metal bellows accumulator and said accumulator housing.

25. A hydraulic damper as set forth in claim 23 wherein said fluid-containing seal is a metal bellows seal.

26. A hydraulic damper as set forth in claim 19 wherein said fluid-containing seal is a metal bellows seal.

27. A hydraulic damper as set forth in claim 26 including at least one metering orifice in said second end wall effecting communication between said inner cylinder and said accumulator.

28. A hydraulic damper as set forth in claim 27 including a valve in said second end wall effecting one-way fluid flow from said accumulator to said cylinder.

29. A hydraulic damper as set forth in claim 28 wherein said at least one metering orifice is in said valve.

30. A hydraulic damper as set forth in claim 19 including a valve in said second end wall effecting one-way fluid flow from said accumulator to said cylinder.

31. A hydraulic damper as set forth in claim 30 including at least one metering orifice in said second end wall effecting communication between said cylinder and said accumulator.

32. A hydraulic damper as set forth in claim 31 wherein said at least one metering orifice is in said valve.

33. A hydraulic damper as set forth in claim 1 including a second cylinder surrounding said cylinder with a space therebetween which is within said fluid circuit.

34. A hydraulic damper as set forth in claim 33 wherein said accumulator is a metal bellows accumulator.

35. A hydraulic damper as set forth in claim 34 wherein said fluid-containing seal is a metal bellows seal.

36. A hydraulic damper as set forth in claim 35 including ball bearings in said first end wall mounting said piston rod.

37. A hydraulic damper as set forth in claim 33 including ball bearings in said first end wall mounting said piston rod.

38. A hydraulic damper comprising a cylinder having an end wall, a piston rod extending through the end wall, and a ball bearing assembly mounted in said end wall for supporting said piston rod.

39. A hydraulic damper as set forth in claim 38 including a leakage-permitting seal in said end wall on one side of said ball bearing assembly, and a bellows seal on the opposite side of said end wall from said leakage-permitting seal.

40. An end wall construction for a hydraulic cylinder comprising an end wall, a ball bearing assembly in said end wall, a leakage-permitting seal in said end wall on one side of said ball bearing assembly, and a bellows seal on the opposite side of said end wall from said leakage-permitting seal.

* * * * *